United States Patent
Dumitru et al.

(10) Patent No.: US 9,227,679 B2
(45) Date of Patent: Jan. 5, 2016

(54) TRACK LINK CONNECTOR WITH TEXTURED REGION

(75) Inventors: Mircea Dumitru, Washington, IL (US); Mark S. Diekevers, Metamora, IL (US); Benoit Abello, Dunlap, IL (US); Gerald T. Otten, Jr., Washington, IL (US)

(73) Assignee: Caterpillar Inc., Peoria, IL (US)

( * ) Notice: Subject to any disclaimer, the term of this patent is extended or adjusted under 35 U.S.C. 154(b) by 521 days.

(21) Appl. No.: 13/537,201

(22) Filed: Jun. 29, 2012

(65) Prior Publication Data

US 2013/0000995 A1 Jan. 3, 2013

Related U.S. Application Data

(60) Provisional application No. 61/502,920, filed on Jun. 30, 2011.

(51) Int. Cl.
  *B62D 55/12* (2006.01)
  *B62D 55/21* (2006.01)
  *B62D 55/088* (2006.01)

(52) U.S. Cl.
  CPC ............ *B62D 55/21* (2013.01); *B62D 55/0887* (2013.01)

(58) Field of Classification Search
  CPC ..... B62D 55/205; B62D 55/21; B62D 55/215
  USPC ................ 305/191, 196, 198, 200–202, 204; 403/240, 242, 263, 280, 282, 375, 384
  See application file for complete search history.

(56) References Cited

U.S. PATENT DOCUMENTS

| | | | |
|---|---|---|---|
| 2,458,935 A | 1/1949 | Forbes | |
| 3,092,423 A | 6/1963 | Speidel et al. | |
| 3,520,574 A | 7/1970 | Wiesner | |
| 3,594,048 A | 7/1971 | Korner et al. | |
| 3,841,716 A | 10/1974 | Webber et al. | |
| 4,136,913 A | 1/1979 | Pietzsch et al. | |
| 4,220,052 A | 9/1980 | Sheldon | |
| 4,618,190 A * | 10/1986 | Garman et al. | 305/204 |
| 5,183,318 A * | 2/1993 | Taft et al. | 305/185 |
| 5,201,171 A * | 4/1993 | Anderton et al. | 305/204 |
| 6,109,706 A * | 8/2000 | Oertley | 305/202 |
| 8,025,346 B2 * | 9/2011 | Livesay | 305/106 |
| 2008/0106042 A1 * | 5/2008 | Roddis et al. | 277/399 |

(Continued)

FOREIGN PATENT DOCUMENTS

| | | |
|---|---|---|
| CN | 87100406 | 4/1988 |
| CN | 1135986 | 11/1996 |
| DE | 2361706 | 6/1975 |
| FR | 2407854 A1 | 6/1979 |

(Continued)

OTHER PUBLICATIONS

U.S. Appl. No. 14/718,708 by Jennifer Brooks et al. filed May 21, 2015 entitled "Chain Assembly Having a Retention Feature."

*Primary Examiner* — Jason Bellinger
(74) *Attorney, Agent, or Firm* — Finnegan, Henderson, Farabow, Garrett & Dunner, LLP

(57) ABSTRACT

A track link connector is disclosed herein that includes an elongate, substantially cylindrical body having a length dimension and including a substantially annular exterior surface and first and second opposing end portions. The track link connector further includes a textured region extending less than 360 degrees around a circumference of the exterior surface of the body at one of the end portions thereof.

21 Claims, 5 Drawing Sheets

(56) References Cited

U.S. PATENT DOCUMENTS

2008/0141513 A1  6/2008  Livesay
2013/0002010 A1  1/2013  Hasselbusch et al.

FOREIGN PATENT DOCUMENTS

GB         885140      12/1961
JP       2004278628    10/2004

* cited by examiner

TRACK LINK CONNECTOR WITH TEXTURED REGION

CROSS-REFERENCE TO RELATED APPLICATION

This application claims the benefit of prior provisional patent application Ser. No. 61/502,920 filed Jun. 30, 2011.

TECHNICAL FIELD

This application relates to track assemblies of machine undercarriages, in particular the track link connectors in such track assemblies.

BACKGROUND

Machines such as track-type tractors, hydraulic excavators, and track loaders frequently utilize undercarriages to travel along a worksite. Such undercarriages frequently include track assemblies. In a track assembly of an undercarriage, track links may be connected to one another by track link connectors such as pins or cartridges. During use of the track assembly, the track link connectors may gradually move axially within the track link bores, potentially weakening the track assembly. The track link connectors may be textured to help prevent such movement, but the textured connector surfaces may cause galling of track link bore surfaces that engage the textured connector surfaces. As a result, when the track link connectors are removed and replaced, track link material may unintentionally be removed with the connectors, thereby reducing track link life. However, the textured connector surfaces may be configured to reduce their impact on track link life.

U.S. Patent Application Publication No. US 2008/0141513 A1 to Livesay discloses a machine component configuration including a pin having a non-directional surface finish along a first portion of the length of the pin and a directional surface finish along a different portion of the length of the pin. The non-directional surface finish may be a circumferential surface finish that provides a fluid seal and the directional surface finish may facilitate press fitting of the pin in one direction while inhibiting removal of the pin in an opposite direction.

SUMMARY

A track link connector is disclosed herein that includes an elongate, substantially cylindrical body having a length dimension and including a substantially annular exterior surface and first and second opposing end portions. The track link connector further includes a textured region extending less than 360 degrees around a circumference of the exterior surface of the body at one of the end portions thereof.

A track assembly for an undercarriage of a machine is disclosed herein. The track assembly includes first and second track links, each defining a bore. The track assembly further includes a track link connector configured for receipt in both the bore of the first track link and the bore of the second track link. The track link connector includes an elongate, substantially cylindrical body having a length dimension and including a substantially annular exterior surface and first and second opposing end portions. The track link connector further includes a textured region extending less than 360 degrees around a circumference of the exterior surface of the body at one of the end portions thereof.

A machine is disclosed herein that includes a chassis and an undercarriage supporting the chassis. The undercarriage includes a track assembly, while the track assembly includes first and second track links, each defining a bore. The track assembly further includes a track link connector configured for receipt in both the bore of the first track link and the bore of the second track link. The track link connector includes an elongate, substantially cylindrical body having a length dimension and including a substantially annular exterior surface and first and second opposing end portions. The track link connector further includes a textured region extending less than 360 degrees around a circumference of the exterior surface of the body at one of the end portions thereof.

DETAILED DESCRIPTION

Figure 1:
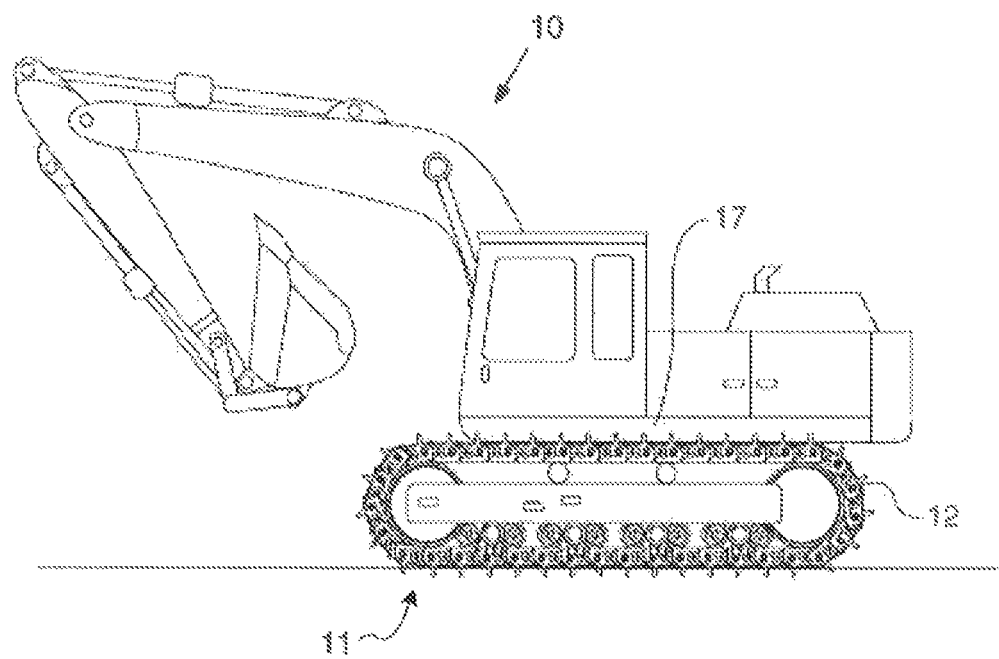
FIG. 1 is an elevational view of a machine having an undercarriage with a track assembly.
Figure 2:
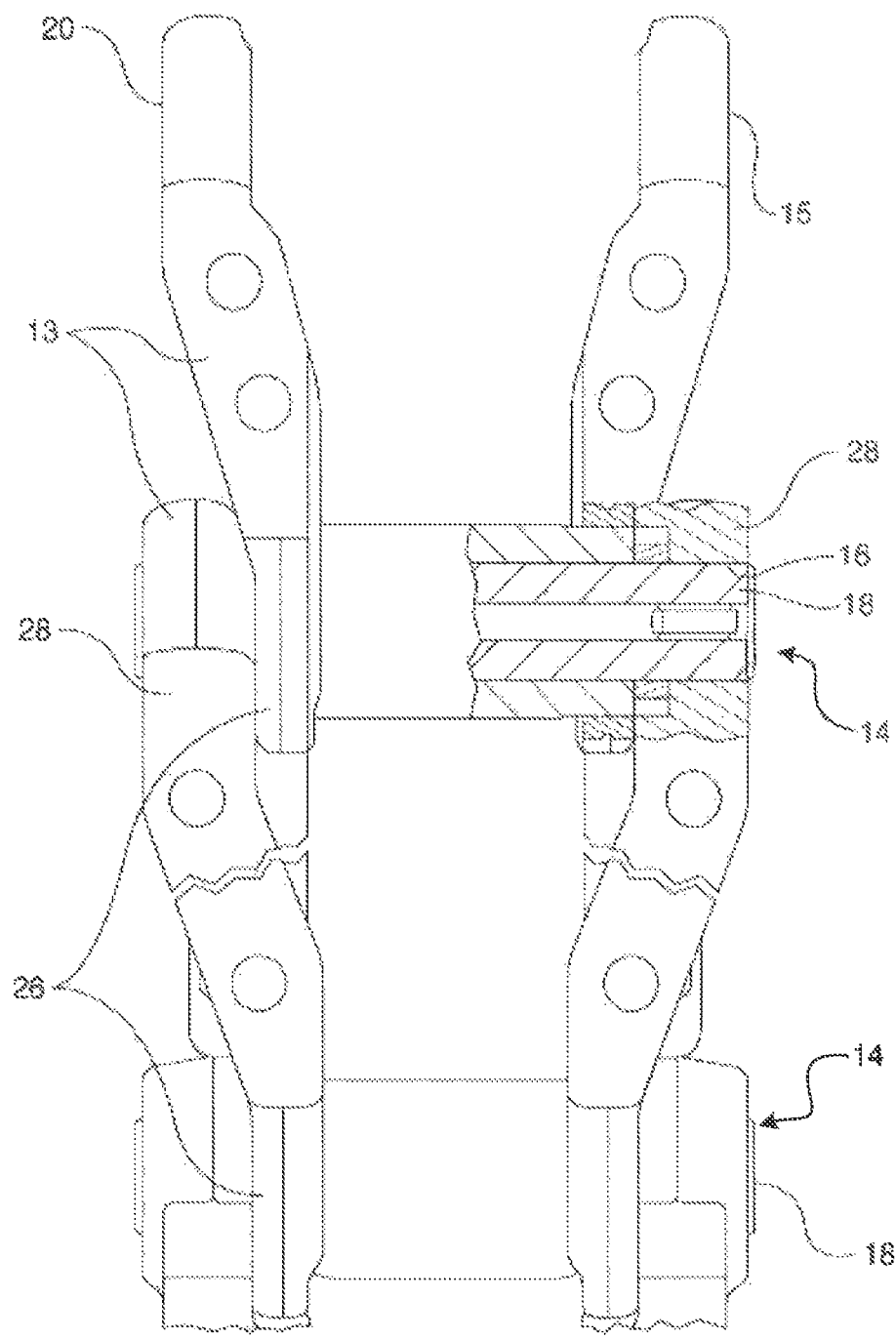
FIG. 2 is a fragmentary top plan view of a track assembly, including a cutaway portion.
Figure 2A:
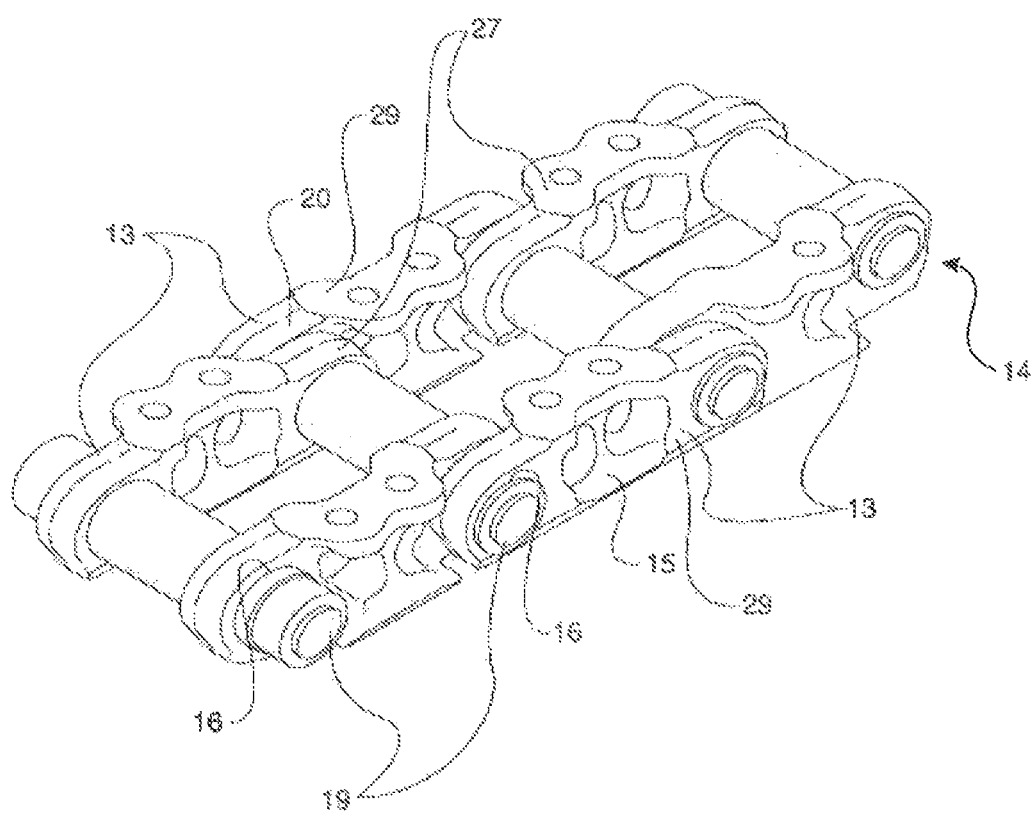
FIG. 2A is a fragmentary perspective view of another track assembly.

A machine is shown broadly at reference numeral 10 in FIG. 1. The machine 10 includes a chassis 17 supported by an undercarriage 11 having a track assembly 12. As shown in FIGS. 2 and 2A, the track assembly 12 includes a plurality of track links 13. Track link connectors 14 are employed to assemble the plurality of track links 13 together. Each of the track link connectors 14 are inserted through bores 16 defined by first and second track links 15, 20 and possibly additional track links in the plurality of track links 13 in order to connect the first and second track links 15, 20 to one another. After the track link connectors 14 have been installed and the track assembly 12 has otherwise been assembled, the first and second track links 15, 20 are spaced apart from one another. The first and second track links 15, 20 are referred to herein only by way of example and may include any combination of inner link portions 26 (FIG. 2) or inner links 27 (FIG. 2A) and outer link portions 28 (FIG. 2) or outer links 29 (FIG. 2A). The track link connectors 14 may be pins, cartridges, or other structures inserted through the bores 16 of the first and second track links 15, 20 to connect the first and second track links 15, 20 to one another. FIG. 2 shows pins 18 as the track link connectors 14, while FIG. 2A shows cartridges 19 as the track link connectors 14. As known by those of ordinary skill in the art, the cartridges 19 may include pins, seals, bearings, bushings, and/or other structures in a unitary track link connector body. For the sake of clarity, the disclosure hereinafter refers to a single track link connector 21 (FIGS. 3 and 4); the illustrated track link connector 21 is a pin, but the scope of the invention extends to cartridges and other track link connectors that fall within the scope of the claims.

Figure 3:
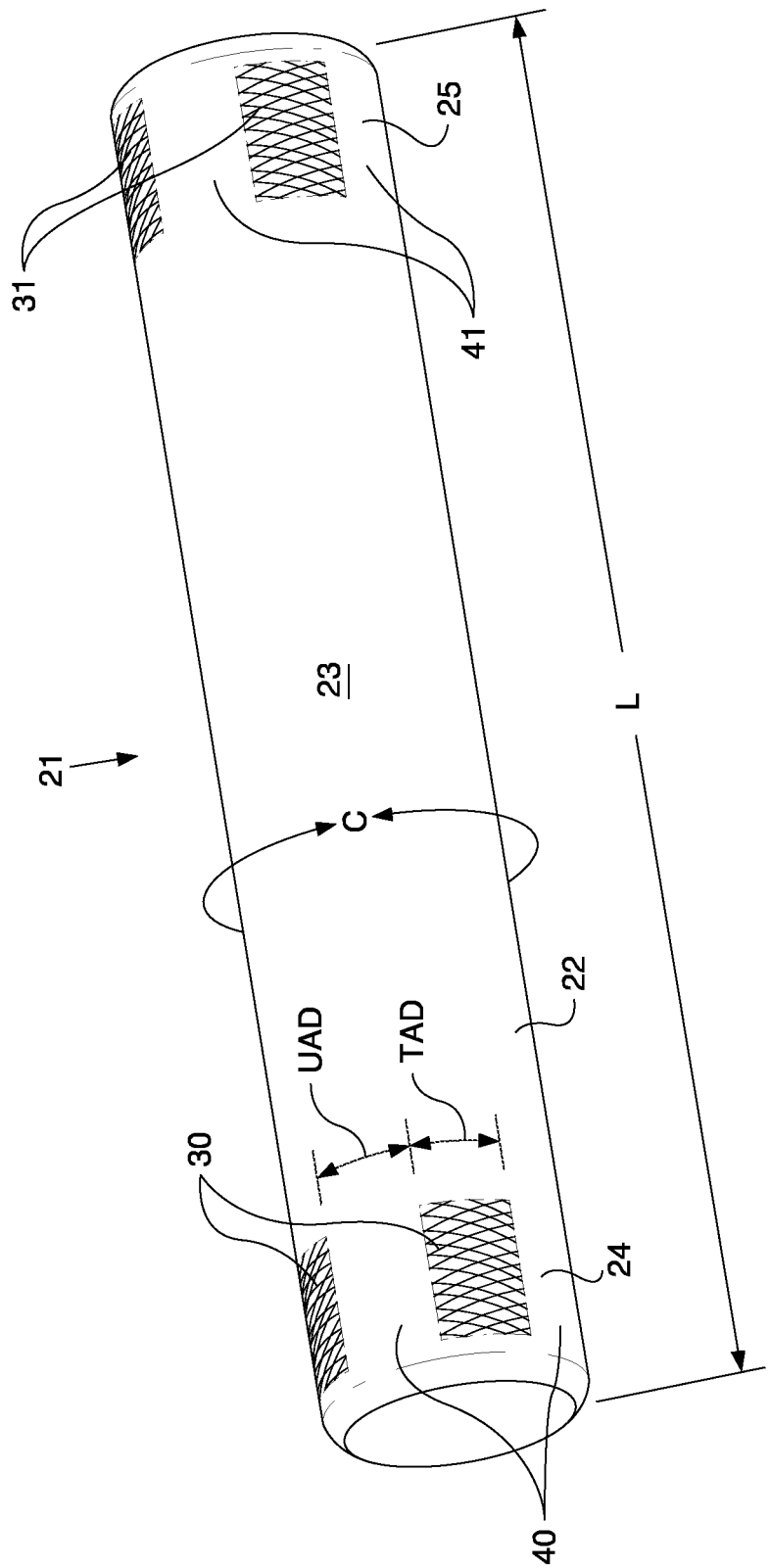
FIG. 3 is a perspective view of a track link connector of a track assembly according to an embodiment of the invention.
Figure 4:
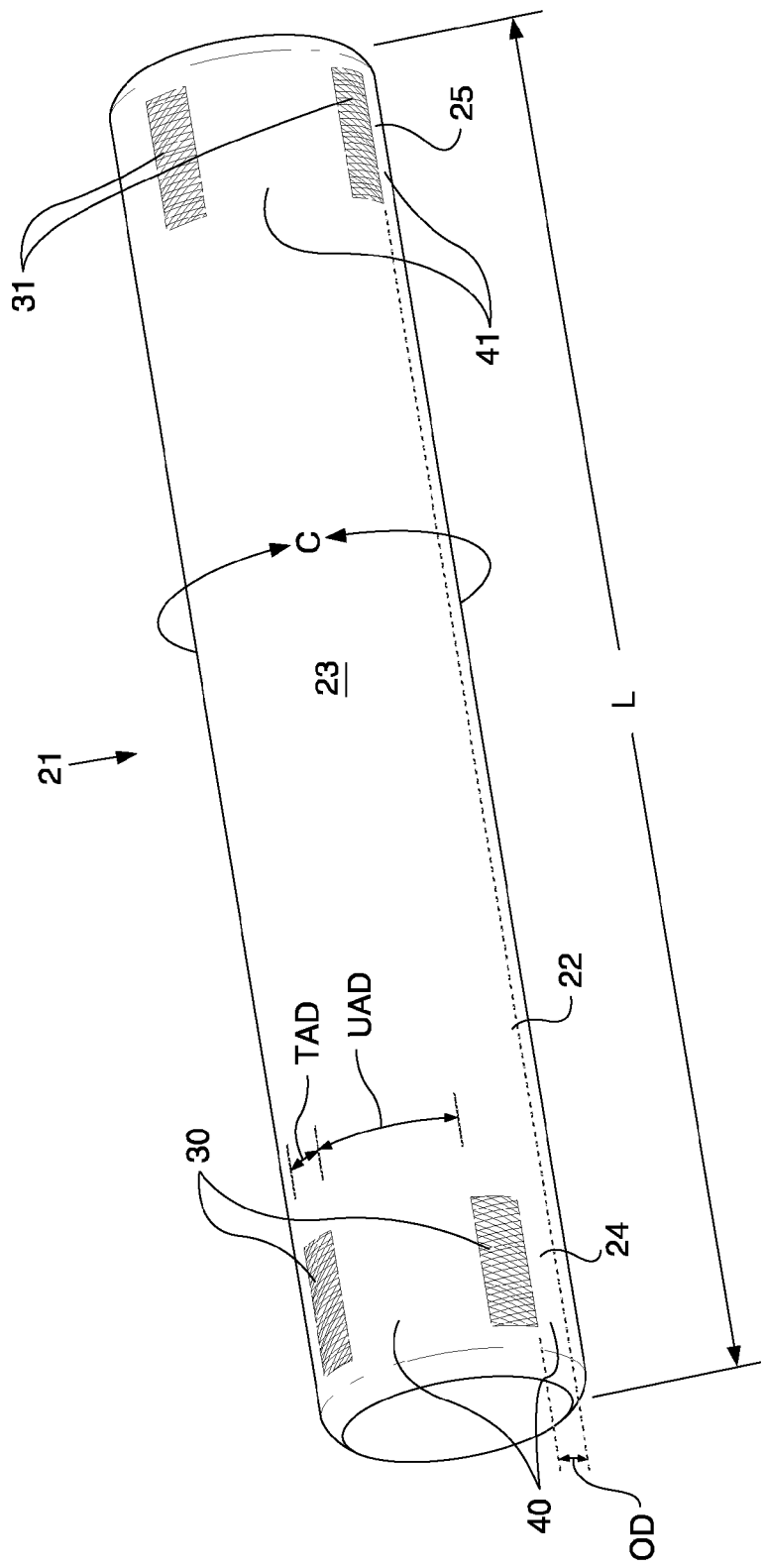
FIG. 4 is a perspective view of a track link connector of a track assembly according to another embodiment of the invention.

Turning now to FIGS. 3 and 4, two alternative embodiments of the track link connector 21 are shown. In both embodiments, the track link connector 21 has an elongate, substantially cylindrical body 22 with a substantially annular exterior surface 23 and first and second opposing end portions 24, 25. A first plurality of textured regions 30 spaced apart by a first plurality of untextured regions 40 extends around a circumference "C" of the exterior surface 23 at the first end portion 24, while a second plurality of textured regions 31 spaced apart by a second plurality of untextured regions 41 extends around the circumference "C" of the exterior surface 23 at the second end portion 25.

In the embodiment shown in FIG. 3, the first plurality of textured regions 30 is substantially aligned with the second plurality of textured regions 31 along a length dimension "L" of the body 22. Similarly, the first plurality of untextured regions 40 is substantially aligned with the second plurality of untextured regions 41 along the length dimension "L" of the body 22. Further, each of the textured regions in the first and second pluralities of textured regions 30, 31 extends a substantially uniform angular distance, hereinafter referred to as a textured angular distance "TAD", around the circumference "C" of the exterior surface 23 of the body 22. Similarly, each of the untextured regions in the first and second pluralities of untextured regions 40, 41 extends a substantially uniform angular distance, hereinafter referred to as an untextured angular distance "UAD", around the circumference "C" of the exterior surface 23 of the body 22. Thus, in the embodiment of the track link connector 21 shown in FIG. 3, the textured regions in the first and second pluralities of textured regions 30, 31 are evenly spaced around the circumference "C" of the exterior surface 23 of the body 22. The textured angular distance "TAD" and the untextured angular distance "UAD" in FIG. 3 are each approximately equal to 45 degrees. However, without departing from the scope of the invention, the textured and untextured angular distances "TAD", "UAD" may each equal substantially greater or less than 45 degrees depending in part on the desired number of evenly spaced textured and untextured regions around the circumference "C" of the exterior surface 23 at the end portions 24, of the body 22.

The embodiment shown in FIG. 4 is similar to the embodiment in FIG. 3 such that the same reference numerals and structures shown in FIG. 3 also appear in FIG. 4. However, in the embodiment shown in FIG. 4, the second plurality of textured regions 31 is angularly offset along the circumference "C" of the exterior surface 23 of the body 22 relative to the first plurality of textured regions 30 such that the first and second pluralities of textured regions 30, 31 do not align along the length dimension "L" of the body 22. Specifically, the second plurality of textured regions 31 is angularly offset from the first plurality of textured regions 30 by an offset distance "OD" approximately equal in magnitude to the textured angular distance "TAD". In addition, in FIG. 4, though the pluralities of textured regions 30, 31 are evenly spaced around the circumference "C" of the exterior surface 23 at the end portions 24, 25 of the body 22, the untextured angular distance "UAD" is greater than the textured angular distance "TAD". Specifically, the textured angular distance "TAD" and the offset distance "OD" are both approximately equal to 22.5 degrees, while the untextured angular distance "UAD" is approximately equal to 67.5 degrees. However, without departing from the scope of the invention, the offset distance "OD" as well as the textured and untextured angular distances "TAD", "UAD" may each be substantially greater or lesser than the specific distances shown in FIG. 4, for instance to accommodate a different number of textured regions or to adjust the offset distance "OD".

The above-described configurations of the textured regions on the track link connector may be further varied without departing from the scope of the invention. For instance, rather than having both the first and second pluralities of textured regions 30, 31 on the exterior surface 23 of the end portions 24, 25 of the body 22, there may be a plurality of textured regions at only one of the end portions 24, 25 of the body 22. More specifically, there may only be either the first plurality of textured regions 30 on the exterior surface 23 of the first end portion 24 of the body 22 or the second plurality of textured regions 31 on the exterior surface 23 of the second end portion 25 of the body 22, rather than both pluralities of textured regions 30, 31 at their respective end portions 24, 25 of the body 22. Furthermore, rather than having a plurality of textured regions on the exterior surface 23 of one or both of the end portions 24, 25 of the body 22, there may only be a single textured region of less than 360 degrees on the exterior surface 23 of either one or both of the end portions 24, 25 of the body. These various options may be achieved, for instance, merely by reducing the quantities and locations of the textured regions 30, 31 shown in FIGS. 3 and 4. Furthermore, the functionality discussed below regarding enabling track link reuse by rotating the track link connector during service of the track assembly is retained when a single plurality of textured regions or a single textured region is employed, and the scarring issues discussed below are ameliorated due to the reduction in the overall textured angular distance on the track link connector. However, the possibility of reduced textured angular distance must be assessed relative to the track link connector retention demands of a given machine or application.

INDUSTRIAL APPLICABILITY

During assembly of the track assembly, the track link connector is installed by being pressure or interference fit into bores defined by the track links for receiving the track link connector. The textured regions on the track link connector described herein help prevent the track link connector from moving axially within the track link bores during use of the track assembly. However, when the track link connector is uninstalled, track link material may be removed from the track link surfaces that define the bores in which the track link connector has resided. For instance, the textured regions on the track link connector may be achieved by knurling the exterior surface of the track link connector before installation of the track link connector in the track assembly. In such a case, after the track link connector is installed into the bores of the track links connected by the track link connector, many of the depressions defined by the knurling on the track link connector may be filled by track link material. Upon removal of the track link connector, much of the track link material in the knurling depressions on the track link connector will be sheared from the track link and removed along with the track link connector, thereby causing track link wear. However, as known by those of ordinary skill in the art and without departing from the scope of the invention, texturing or abrading methods other than knurling may be utilized to create the textured regions on the track link connector and may have varying effects on track link connector retention, track link life, and track assembly maintenance schedules.

The above-described configurations of the textured and untextured regions on the track link connector of the track assembly retain the benefit of helping to prevent axial movement of the track link connector in the track link bores during use of the track assembly while reducing the impact of the track link wear described above on track link life. For instance, if the track link connector shown in FIG. 3 is used, when the track assembly is serviced, the track link connector may be rotated 45 degrees to ensure that the textured regions on the track link connector are engaging virgin track link material in the track link bores rather than the track link material engaged by the textured regions on the track link connector before the track assembly was serviced. Depending on the condition of the original track link connector when the track assembly is serviced, the original track link connector may merely be rotated and reinstalled in the track links or a new replacement track link connector may be inserted in the rotated orientation. In either case, absent other issues necessitating replacement of the track link, the track link may be reused for a total of two uses.

If the track link connector shown in FIG. 4 is used both as the original track link connector and the replacement track link connector when the track assembly is serviced, during service of the track assembly the track link connector may be rotated 22.5 degrees to ensure that the textured regions on the track link connector are engaging virgin track link material in the track link bores rather than the track link material engaged by the textured regions on the track link connector before the track assembly was serviced. Depending on the condition of the original track link connector when the track assembly is serviced, the original track link connector may merely be rotated and reinstalled in the track links or a new replacement track link connector may be inserted in the rotated orientation. A more specific explanation of this process follows. During service of the track assembly, the first and second pluralities of textured regions on the track link connector scar the track link material in the track link bores both when the track link connector is removed and when the track link connector is reinserted. However, after rotation of the track link connector by the offset distance (22.5 degrees in the embodiment illustrated in FIG. 4), the offset orientation of the first and second pluralities of textured regions on the track link connector prevents the scarred portions of the track link bores from engaging the first and second plurality of textured regions on the track link connector after the track link connector is fully reinserted. In sum, when the track link connector shown in FIG. 4 is utilized, in light of the size and orientation of the textured regions thereon, absent other issues necessitating replacement of the track link, the track link may be reused twice for a total of three uses.

The benefits provided by the textured regions of the track link connector (i.e., helping to prevent axial movement of the track link connector in the track link bores) may be negatively impacted by the reduction in the size of the textured regions of the track link connector in the embodiment shown in FIG. 4. However, when any given textured region in the first plurality of textured regions 30 on the first end portion 24 of the track link connector 21 is considered in concert with the corresponding offset textured region in the second plurality of textured regions 31 on the second end portion 25 of the track link connector 21, the overall textured angular distance of the paired textured regions around the circumference "C" of the exterior surface 23 of the track link connector 21 is a continuous 45 degrees, the same as in the embodiment shown in FIG. 3.

As an alternative to using the track link connector shown in FIG. 3 or the track link connector shown in FIG. 4 as both the original track link connector and the service track link connector, the two designs may be mixed and matched over the life of the track assembly as any given machine or application warrants. Further, as mentioned above, the specific spacings of the textured and untextured regions around the circumference of the track link connector may vary depending on the machine or application. For instance, in an application or environment more likely to cause axial movement of the track link connector in the track link bores, larger textured regions on the track link connector and more frequent replacement of the track links may be appropriate. Conversely, in a different application or environment, perhaps smaller textured regions on the track link connector would be sufficient for track link connector retention and maximizing the life of the track links would be the paramount concern. Further, as machines or applications vary, the textured regions on the track link connector may or may not be evenly spaced around the circumference "C" of the track link connector and the size of the textured regions along the length dimension "L" of the track link connector may vary.

A track link connector with a textured region is described above. Many variations of the disclosed embodiments may be practiced without departing from the scope of the invention, which is defined by the following claims.

What is claimed is:

1. A track link connector, comprising:
   an elongate, substantially cylindrical body having a length dimension and including a substantially annular exterior surface and first and second opposing end portions;
   a textured region extending less than 360 degrees around a circumference of the exterior surface of the body at one of the end portions thereof; and
   an untextured region extending around the circumference of the exterior surface of the body adjacent to the textured region in a circumferential direction,
   wherein the body includes a substantially constant diameter at the circumference that includes the textured region and the untextured region, and
   wherein the textured region includes a first surface roughness and the untextured region includes a second surface roughness, the first surface roughness being greater than the second surface roughness.

2. The track link connector of claim 1, wherein the textured region is one of a first plurality of textured regions spaced apart from one another around the circumference of the exterior surface of the body at the first end portion thereof.

3. The track link connector of claim 2, further comprising a second plurality of textured regions spaced apart from one another around the circumference of the exterior surface of the body at the second end portion thereof.

4. The track link connector of claim 3, wherein the first plurality of textured regions is substantially aligned with the second plurality of textured regions along the length dimension of the body.

5. The track link connector of claim 3, wherein each textured region in the first and second pluralities of textured regions extends a substantially uniform textured angular distance around the circumference of the annular exterior surface of the body at the first and second end portions thereof, respectively.

6. The track link connector of claim 3, wherein each textured region in the first and second pluralities of textured regions extends a substantially uniform textured angular distance around the circumference of the annular exterior surface of the body and the second plurality of textured regions is angularly offset from the first plurality of textured regions by an offset distance along the circumference of the body.

7. The track link connector of claim 6, wherein the textured angular distance and the offset distance are approximately equal.

8. A track assembly for an undercarriage of a machine, the track assembly comprising:
   first and second track links, each defining a bore; and
   a track link connector configured for receipt in both the bore of the first track link and the bore of the second track link, the track link connector comprising
   an elongate, substantially cylindrical body having a length dimension and including a substantially annular exterior surface and first and second opposing end portions;

a textured region extending less than 360 degrees around a circumference of the exterior surface of the body at one of the end portions thereof; and an untextured region extending around the circumference of the exterior surface of the body adjacent to the textured region in a circumferential direction, wherein the textured region includes a first surface roughness and the untextured region includes a second surface roughness, the first surface roughness being greater than the second surface roughness, and wherein the cylindrical body includes a first radius between a center of the cylindrical body and the textured region and a second radius between the center of the cylindrical body and untextured region, the first radius being equal to the second radius.

9. The track assembly of claim 8, wherein the textured region is one of a first plurality of textured regions spaced apart from one another around the circumference of the exterior surface of the body of the track link connector at the first end portion thereof.

10. The track assembly of claim 9, further comprising a second plurality of textured regions spaced apart from one another around the circumference of the exterior surface of the body of the track link connector at the second end portion thereof.

11. The track assembly of claim 10, wherein the first plurality of textured regions is substantially aligned with the second plurality of textured regions along the length dimension of the body of the track link connector.

12. The track assembly of claim 10, wherein each textured region in the first and second pluralities of textured regions extends a substantially uniform textured angular distance around the circumference of the annular exterior surface of the body of the track link connector at the first and second end portions thereof, respectively.

13. The track assembly of claim 10, wherein each textured region in the first and second pluralities of textured regions extends a substantially uniform textured angular distance around the circumference of the annular exterior surface of the body of the track link connector and the second plurality of textured regions is angularly offset from the first plurality of textured regions by an offset distance along the circumference of the body of the track link connector.

14. The track assembly of claim 13, wherein the textured angular distance and the offset distance are approximately equal.

15. A machine, comprising:
a chassis; and
an undercarriage supporting the chassis, the undercarriage including a track assembly, the track assembly comprising first and second track links, each defining a bore; and
a track link connector configured for receipt in both the bore of the first rack link and the bore of the second track link, the track link connector comprising an elongate, substantially cylindrical body having a length dimension and including a substantially annular exterior surface and first and second opposing end portions;

a textured region extending less than 360 degrees around a circumference of the exterior surface of the body at one of the end portions thereof, an untextured region extending around the circumference of the exterior surface of the body adjacent to the textured region in a circumferential direction;

wherein the body includes a substantially constant diameter at the circumference that includes the textured region and the untextured region, and wherein the textured region includes a first surface roughness and the untextured region includes a second surface roughness, the first surface roughness being greater than the second surface roughness.

16. The machine of claim 15, wherein the textured region is one of a first plurality of textured regions spaced apart from one another around the circumference of the exterior surface of the body of the track link connector at the first end portion thereof.

17. The machine of claim 16, further comprising a second plurality of textured regions spaced apart from one another around the circumference of the exterior surface of the body of the track link connector at the second end portion thereof.

18. The machine of claim 17, wherein the first plurality of textured regions is substantially aligned with the second plurality of textured regions along the length dimension of the body of the track link connector.

19. The machine of claim 17, wherein each textured region in the first and second pluralities of textured regions extends a substantially uniform textured angular distance around the circumference of the annular exterior surface of the body of the track link connector at the first and second end portions thereof, respectively.

20. The machine of claim 17, wherein each textured region in the first and second pluralities of textured regions extends a substantially uniform textured angular distance around the circumference of the annular exterior surface of the body of the track link connector and the second plurality of textured regions is angularly offset from the first plurality of textured regions by an offset distance along the circumference of the body of the track link connector.

21. The track assembly of claim 8, wherein the textured region and the untextured region are in contact with a surface defined by the bore of the first track link when the track link connector is received in the bore of the first track link.

\* \* \* \* \*